(12) United States Patent
Rehwald et al.

(10) Patent No.: US 10,088,005 B2
(45) Date of Patent: Oct. 2, 2018

(54) HOLDER FOR FASTENING A COMPONENT ON AN INTERNAL COMBUSTION ENGINE, A BEARING BUSH FOR SUCH A HOLDER, AND A FUEL INJECTION SYSTEM

(71) Applicant: Robert Bosch GmbH, Stuttgart (DE)

(72) Inventors: Andreas Rehwald, Bietigheim-Bissingen (DE); Matthias Maess, Boeblingen (DE); Goekhan Guengoer, Eberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 237 days.

(21) Appl. No.: 14/388,025

(22) PCT Filed: Feb. 12, 2013

(86) PCT No.: PCT/EP2013/052771
§ 371 (c)(1),
(2) Date: Sep. 25, 2014

(87) PCT Pub. No.: WO2013/143749
PCT Pub. Date: Oct. 3, 2013

(65) Prior Publication Data
US 2015/0176672 A1    Jun. 25, 2015

(30) Foreign Application Priority Data
Mar. 27, 2012  (DE) .................. 10 2012 204 845

(51) Int. Cl.
*F02M 61/14* (2006.01)
*F02F 11/00* (2006.01)
(Continued)

(52) U.S. Cl.
CPC .............. *F16F 1/38* (2013.01); *F02M 55/025* (2013.01); *F02M 61/14* (2013.01);
(Continued)

(58) Field of Classification Search
CPC .... F02M 61/14; F02M 69/465; F02M 61/145; F02M 55/025; F02M 2200/306;
(Continued)

(56) References Cited

U.S. PATENT DOCUMENTS 3,857,573 A * 12/1974 Pugh .................... F02M 61/145
                                                277/598
4,773,635 A *  9/1988 Buma ...................... F16F 9/466
                                                188/266.4

(Continued)

FOREIGN PATENT DOCUMENTS

DE    10 2005 008038    8/2006
EP         0 065 581    12/1982
(Continued)

*Primary Examiner* — Syed O Hasan
(74) *Attorney, Agent, or Firm* — Norton Rose Fulbright US LLP; Gerard Messina

(57) ABSTRACT

A bearing bush is for a holder, which is for fastening a component, particularly of a fuel distributor, to an add-on structure. The bearing bush has an inner bush part, which is made of a metallic material, and an outer bush part, which is made of a metallic material, and an elastically deformable damping element. The outer bush part has a continuous recess, in which the inner bush part is situated. The damping element is situated between the inner bush part and the outer bush part. A holder having such a bearing bush is also specified. In addition, a fuel-injection system having a fuel distributor and at least one holder is specified, which is used for fastening the fuel distributor on an internal combustion engine.

14 Claims, 3 Drawing Sheets

(51) Int. Cl.
*F16F 1/38* (2006.01)
*F02M 55/02* (2006.01)

(52) U.S. Cl.
CPC . *F02M 2200/306* (2013.01); *F02M 2200/857* (2013.01); *Y10T 403/451* (2015.01)

(58) Field of Classification Search
CPC ............... F02M 2200/852; F16J 15/123; F16J 15/0818; F16J 15/0825; F16J 1/38; F02F 11/002; F02F 7/006
USPC .......................... 123/470, 468; 277/313, 591
See application file for complete search history.

(56) References Cited

U.S. PATENT DOCUMENTS

| | | |
|---|---|---|
| 5,044,338 A | 9/1991 | Shelton |
| 5,809,974 A | 9/1998 | Osakabe |
| 6,059,503 A | 5/2000 | Johnson |
| 7,682,117 B2 | 3/2010 | Holt et al. |
| 7,793,639 B2 * | 9/2010 | Hunt ..................... F02M 55/025 123/470 |
| 2002/0148427 A1 * | 10/2002 | Jones .................. B29C 66/1142 123/184.61 |
| 2007/0145657 A1 * | 6/2007 | Funano ................. B60G 21/052 267/293 |
| 2011/0073074 A1 | 3/2011 | Hay et al. |
| 2011/0127744 A1 * | 6/2011 | Siebeneick .......... B60G 21/052 280/124.128 |

FOREIGN PATENT DOCUMENTS

| | | |
|---|---|---|
| EP | 1 167 166 | 1/2002 |
| EP | 1 464 824 | 10/2004 |
| EP | 2 333 301 | 6/2011 |
| EP | 0065581 | * 12/2012 |

* cited by examiner

HOLDER FOR FASTENING A COMPONENT ON AN INTERNAL COMBUSTION ENGINE, A BEARING BUSH FOR SUCH A HOLDER, AND A FUEL INJECTION SYSTEM

FIELD OF THE INVENTION

The present invention relates to a holder for fastening at least one component, especially a fuel distributor, on an internal combustion engine. The present invention especially relates to the field of fuel injection systems of internal combustion engines.

BACKGROUND INFORMATION

An insulating holder for connecting a common rail of a fuel injection system for the direct injection of fuel to an internal combustion engine is discussed in U.S. Pat. No. 7,682,117 B2. Clamping elements are provided, which face each other, and are used as prestressing limiters and have a damping ring made of an elastomer assigned to them in each case. In the fastening, the axial prestressing excursion is limited via a gap between the clamping elements.

In the holder of U.S. Pat. No. 7,682,117 B2, it is therefore possible to use two annular elastomeric components in combination with two metal sleeves for the damping, while the prestressing is limited. The limitation is adjustable via the defined gap, in this instance. The gap is bridged during the screwing connection, and the annular elastomeric components are prestressed. The clamping force or the prestressing of the elastomeric components may be set via the axial stiffness and via the specified gap height. As soon as the metal sleeves reach a hard stop, the additional screw prestressing is no longer introduced into the elastomeric components but rather into the metal components. This protects the elastomeric components against overexpansion and against failure when the tightening torques are too high.

The functioning principle, from U.S. Pat. No. 7,682,117 B2, for separating prestressing and screw prestressing force has several disadvantages, however. Based on the concept, the elastomeric components see a large prestressing or preexpansion, in order to ensure the axially minimum clamping force. This already results in a substantial prestressing of the elastomeric components after assembly. Based on the separate part tolerances, particularly measurements of height, of the elastomeric components and the metal sleeves, in addition, tolerance-conditioned scattering of the preexpansion set in the elastomeric components. Above all, thin elastomeric components are very susceptible with respect to this tolerance chain, whereby design clearances are lost. The maximum boundary samples prestressed the most for tolerance-related reasons are especially at risk of tearing, whereas the corresponding minimum boundary samples result in a low clamping force with respect to the internal combustion engine.

It is just as little possible to use optionally resilient elastomeric components, since these result in higher, quasi static displacements of the fuel distributor and of the injection valve with regard to the initiation of operating forces which, in turn, would lead to increased wear of the seals of the injection valves. As a further disadvantage, the elastomer material is able to move at the boundary layers between the elastomeric components and the metal sleeves, tangentially to the rigid metal surface. This effect leads to heavy abrasion of the elastomer at the contact surfaces, and thus to a high risk of failure of the elastomeric components.

SUMMARY OF THE INVENTION

The bearing bush according to the present invention, having the features described herein, the holder according to the present invention having the features described herein, and the fuel injection system according to the present invention having the features described herein have the advantage of ensuring better vibration damping over their service life. The disadvantages of the related art mentioned are especially avoidable. In this context, in an advantageous manner, a vibration-technological decoupling between the components, particularly of the fuel distributor and the internal combustion engine, may be ensured. Noise emissions may thereby be lowered.

The measures mentioned in the dependent claims permit advantageous further developments of the bearing bush described herein, of the holder described herein, and of the fuel-injection system described herein.

One advantageous area of use is for mixture-compressing internal combustion engines having externally supplied ignition. One application area is for direct gasoline injection. The fuel distributor may be implemented as a fuel distributor rail in this context. The fuel distributor is used as a shared fuel reservoir for multiple high-pressure fuel injectors. While in operation, the fuel injectors connected to the fuel distributor inject the fuel required for the combustion process into the combustion chambers of the internal combustion engine under high pressure. For this purpose, the fuel is first compressed by a high-pressure pump and then conveyed in controlled quantities into the fuel distributor via a high-pressure line. In operation, the problem arises that the fuel distributor may be excited to vibrations in the audible frequency range. Above all, this may happen because of noise sources in the fuel injectors that are components of a fuel injection system. The structure-borne noise, in this instance, spreads from the fuel injectors, via rail bucket tappets, the fuel distributor and the holder to the externally-mounted structure, from where disturbing noises may be radiated which, under certain circumstances, may even penetrate into the interior of the vehicle. The add-on structure generally is the cylinder head of the internal combustion engine. However, a linkage of the fuel distributor via spacer sleeves or via additional connection elements is possible as well. The generation of vibrations in the audible frequency range is advantageously able to be avoided or at least reduced by the bearing bush according to the present invention. A reliable reduction of the structure-borne noise transmission can be ensured over the service life. In particular, noise that penetrates the interior of the vehicle is avoidable in this way.

In an advantageous manner, the bearing bush may be configured as a component in which the separate parts are connected to one another. This simplifies handling and assembly. In addition, conditioned upon the configuration, a defined positioning of the inner bush part comes about, of the outer bush part and of the damping element. This embodiment also enables advantageous connections of the bearing bush to the holder body of the holder.

The inner bush part and the outer bush part may advantageously be made of two metal sleeves lying inside each other, which are laid into a mold. Subsequently, a plastic, especially an elastomeric plastic, may be introduced into the mold, so that an intermediate space between the inner bush part and the outer bush part is filled up. By special production methods, such as vulcanizing, it may be achieved in an advantageous manner that the material for the damping element, particularly the elastomeric partition, combines integrally with the metal surfaces. After release from the mold, the bush parts and the damping element, that are firmly connected to one another, thus form a component made up of the metallic bush parts and the damping element. Since the contact areas between the metallic materials and the elastically deformable material of the damping element are firmly connected to each other, the joints in this embodiment have a particularly great resistance to wear. In addition, the elastically deformable damping element is at first not under prestressing. Even in the mounted state, the damping element does not necessarily have to absorb screw forces since the frictional connection between a fastening arrangement, particularly a screw, is able to be guided onto the internal combustion engine completely via the inner bush part.

The damping element advantageously prevents a metallic contact between the inner bush part and the outer bush part, so that a complete elastic insulation is ensured between the component, particularly the fuel distributor, and the internal combustion engine. An insulating effect in all spatial directions may be achieved in that the material for the elastically deformable damping element has great material damping. Thereby, even at a very small layer thickness of the damping element, which may be, for example, in a range of a few tenths of a millimeter, a clear insulation effect may be achieved. Consequently, a layer thickness of the elastically deformable damping element of less than 1 mm may be specified.

Thus, it is advantageous that the damping element is connected integrally with the inner bush part and the damping element is connected integrally with the outer bush part. In this instance, it is also advantageous that the damping element is connected to the inner bush part by vulcanizing and that the damping element is connected to the outer bush part by vulcanizing. In an advantageous manner, the damping element may be developed on the basis of at least one elastomer or a rubber. In this instance, a small layer thickness is able to be implemented.

Moreover, it is of advantage that the outer bush part has a shoulder on the continuous recess, that the inner bush part has a shoulder on the continuous recess which is assigned to the shoulder of the outer bush part, and that the inner bush part is supported on the shoulder of the inner bush part, via the damping element, on the shoulder of the outer bush part. In this way, an advantageous contour may be specified of the elastomer layer or the like forming the damping element. The contour of the damping element may thereby be defined by the production process described. Because of the shoulders between the bush parts, an inadmissibly large relative motion of the bush parts with respect to each other under axial stressing may be limited, so that excessive shearing in the damping element, especially in the elastomer layer, and thus its failure is prevented.

It is also advantageous that the inner bush part and the outer bush part have supporting contours adapted to each other at the continuous recess. Thereby, in addition, axial cross section changes are able to be specified, by which the axial contact surfaces between the metallic bush parts and the damping element configured as a layer, particularly as an elastomer layer, increase in total. Because of this, the protection of the damping element from the shearing wear, amid the initiation of operating forces, may be further improved.

The supporting contours may be embodied annularly about the longitudinal axis of the bearing bush. The supporting contours adapted to each other may, in this case, advantageously be a groove and a rib or disk assigned to the groove and/or shoulders assigned to each other. The groove, rib, disk or the shoulders are in this case may be configured annularly on the bush parts. In this instance, a plurality of such supporting contours may be provided in the longitudinal direction. Meanwhile, the supporting contours may be configured differently or in repetitive fashion.

For the configuration of the holder, the bearing bush is advantageously connected to the holder body of the holder. In this case, the outer bush part of the bearing bush is advantageously connected to the holder body, whereby an advantageous joining concept becomes used. One may therefore omit a hard-solder process for the connection, which would have the problem, for example, that an elastomer could be destroyed while passing through the soldering oven.

It is advantageous that the outer bush part of the bearing bush is pressed into the holder body. This has the additional advantage that, when using several bearing bushes, the bearing bushes may be pressed in with respect to a reference or adjusted with respect to a reference. Thereby, good leveling of the holder with regard to a reference plane may be achieved. Because of this, in turn, the advantage arises that a possibly occurring, additional prestressing of the damping elements, based on assembly at uneven holder positions, is at least extensively avoided. In order to achieve a sufficient pressing length, this joining method is suitable above all in combination with massive, particularly cast bush parts of the bearing bush.

It is also advantageous that the outer bush part of the bearing bush is caulked to the holder body. In this instance, the outer bush part may also be pressed in and caulked. In an advantageous manner, pressing in with subsequent caulking may take place. This has the advantage that smaller pressing lengths may be implemented. In this connection, a thinnerholding section of the holder body may be pressed, up to an outer step, onto the bearing bush. By pressing on a ram, the material in the area of the upper edge may be deformed plastically over and beyond the upper side of the holding section of the holder body. Because of this, a reliable fastening of bearing bushes having smaller pressing lengths is possible.

It is also of advantage that the outer bush part of the bearing bush is connected to the holder body via a screwing element. The screwing element may be configured particularly as a nut. For this, the outer bush part of the bearing bush may have an outer thread. To increase the effective clamping length, it is advantageous that the screwing element, especially the nut, have an annular groove.

A further advantageous connection may be implemented by laser welding. In this case, it is advantageous that the outer bush part of the bearing bush is welded to the holder body. Laser welding may also be done in combination with press-fitting. In laser welding one has to make sure that the local heat input does not lead to the destruction of the elastically deformable material of the damping element. By contrast to welding using a continuous-heating furnace, the local heat input is able to be well limited in the case of laser welding. Laser seams may be made, in this case, both on the upper and on the lower side. A line seam may possibly be used.

Numerous advantages may thus be achieved.

The noise transmission from a fuel distributor into the add-on structure, especially into the internal combustion engine, decreases in response to a rigid screw joint.

Vibrations of the fuel distributor may be damped more greatly, whereby the sound radiation from the surface of the fuel distributor diminishes.

The vibrational stressing of the fuel distributor and of the high-pressure injector valves based on the vibrational stressing of the internal combustion engine decreases, since the vibrational transmission in this direction is also being damped. Thereby advantages are created with respect to the configuration and reliability of these components.

Because of the vulcanization process, the elastomeric layer or a compatible layer, of which the damping element is made, adheres particularly well to the metallic bush parts. Thereby tangential relative motions are avoided. Furthermore, the risk of the formation of a tear on the contact surface and the risk of abrasion are reduced.

Compared to the use of prestressing elements or sleeves, which limit prestressing, and between these laid-in insulators, a configuration is possible in which, in the assembled state, no stressing resulting from the screw prestressing acts on the damping element, since the fuel distributor is connected with form locking to the damping element via the outer bush part. This results in a particularly wear-resistant embodiment, and a substantially lower risk of failure is demonstrated than under strong prestressing.

With respect to the use of prestressing elements and laid-in insulators, the number of components may be reduced in addition.

Besides that, the shape of the damping element, within the scope of production engineering possibilities, may carried out in an optional manner.

The elastically deformable damping element is advantageously made of a rubber. The term rubber should be understood generally in this case. By rubber one may understand both natural rubber and synthetic varieties. The embodiment of the damping element as made of a polymeric material is also a possibility. In this case, thermoplastic elastomers particularly apply. Using pure thermoplastics is also a possibility. If the damping element is made of a pure thermoplastic, it is true that poor damping properties come about, but instead, a better durability and thus a durable stability.

An integral connection between the metallic bush parts and the elastically deformable damping element by vulcanization is advantageously possible in the case of an embodiment made of rubber.

Exemplary embodiments of the present invention are described in greater detail in the following description with reference to the appended drawings, in which corresponding elements are provided with the same reference numerals.

DETAILED DESCRIPTION

Figure 1:
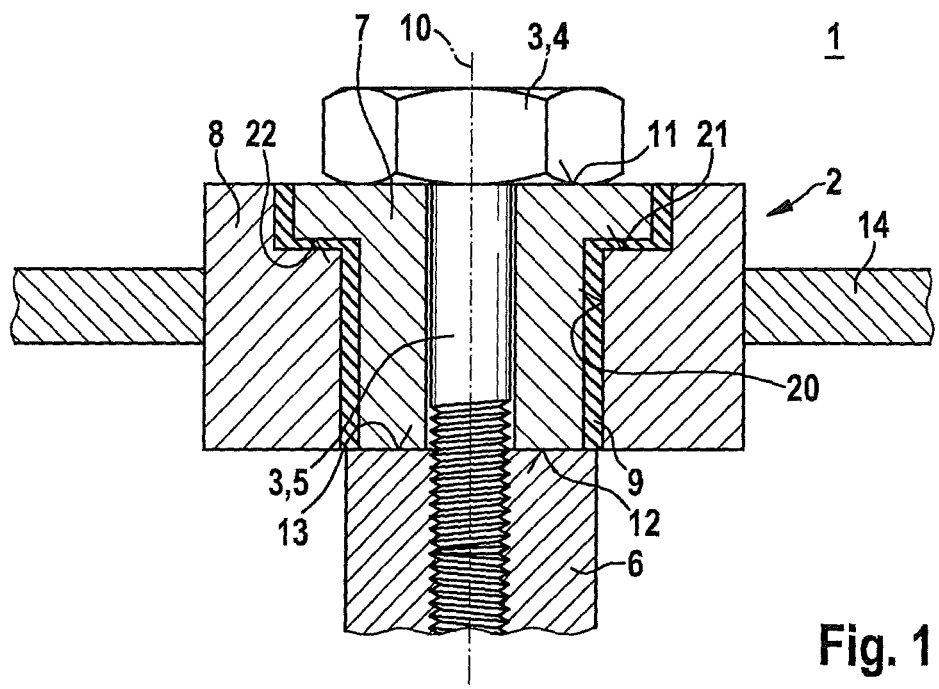
FIG. 1 a holder having a bearing bush for fastening a component to an internal combustion engine in a schematic sectional representation in excerpted form, corresponding to a first exemplary embodiment of the present invention.

FIG. 1 shows a holder 1 having a bearing bush 2 in a schematic sectional representation in excerpted form, corresponding to a first exemplary embodiment of the present invention.

Holder 1 has fastening arrangement 3, which in this exemplary embodiment is configured as a screw 3. Fastening arrangement 3 has a head 4 and a bolt (screw bolt) 5. Using fastening arrangement 3, bearing bush 2 is fastened to an add-on structure 6. Add-on structure 6 may be an internal combustion engine 6, especially a cylinder head 6 of an internal combustion engine 6, in this exemplary embodiment.

Bearing bush 2 has an inner bush part 7 and an outer bush part 8. Furthermore, bearing bush 2 has an elastically deformable damping element 9.

Bush parts 7, 8 are each formed of a metallic material. In this context, bush parts 7, 8 may also be formed of the same metallic material.

The elastically deformable damping element 9 may be made of a rubber, that is, an elastomeric layer. Damping element 9 may especially be made of a synthetic rubber. Because of its embodiment as a rubber, the layer which forms the elastically deformable damping element 9, may be connected, on the one hand, integrally to inner bush part 7 and, on the other hand, integrally to outer bush part 8. Elastically deformable damping element 9 is situated between inner bush part 7 and outer bush part 8 in such a way that it is, on the one hand, configured as a thin layer and that, on the other hand, there exists nowhere a direct contact between inner bush part 7 and outer bush part 8.

In this exemplary embodiment, inner bush part 7 is situated along a longitudinal axis 10 of bearing bush 2 within outer bush part 8. Depending on the embodiment, it is also conceivable that inner bush part 7 projects beyond outer bush part 8 along longitudinal axis 10 on one or both sides.

The elastically deformable damping element 9 that is situated between bush parts 7, 8 is not acted upon with any prestressing during the mounting of holder 1 on add-on structure 6, for head 4 of screw 3 rests completely on an upper side 11 of inner bush part 7, inner bush part 7, in turn, supporting itself with its lower side 12 on a contact surface 13 of add-on structure 6. Consequently, assembly is also simplified, since deviations of the actual torque of screw 3 from a setpoint torque have no effect on damping element 9.

Holder 1 has a holder body 14, shown in excerpted form. Bearing bush 2 is connected to holder body 14 in a suitable manner. Possible embodiments for the connection of bearing bush 2 to holder body 14 are described with reference to FIGS. 3 through 6.

Outer bush part 8 has a continuous recess 20. Continuous recess 20 may in particular be embodied as a stepped bore 20. Outer bush part 8 has a shoulder 21 on continuous recess 20. Inner bush part 7 has a shoulder 22 on continuous recess 20. Shoulder 22 of inner bush part 7 is assigned to shoulder 21 of outer bush part 8. During the production of bearing bush 2, bush parts 7, 8 are positioned relative to each other, a gap remaining at continuous recess 20 between the two bush parts 7, 8. This gap is filled up with the material for damping element 9, particularly the rubber. In particular, it is possible to inject the material into the gap. Damping element 9 is then located in particular between shoulders 21, 22, so that inner bush part 7 supports itself with its shoulder 22 via damping element 9 on shoulder 21 of outer bush part 8. Relative motions taking place during operation, between outer bush part 8 and inner bush part 7 are effectively limited by the interaction at shoulders 21, 22. Since damping element 9 may be connected integrally to bush parts 7, 8, an effective limitation of the relative motion comes about between bush parts 7, 8. In the case of the embodiment of damping element 9 of a rubber, the damping element is able to be connected by vulcanization to inner bush part 7 as well as by vulcanization to outer bush part 8.

Figure 2:
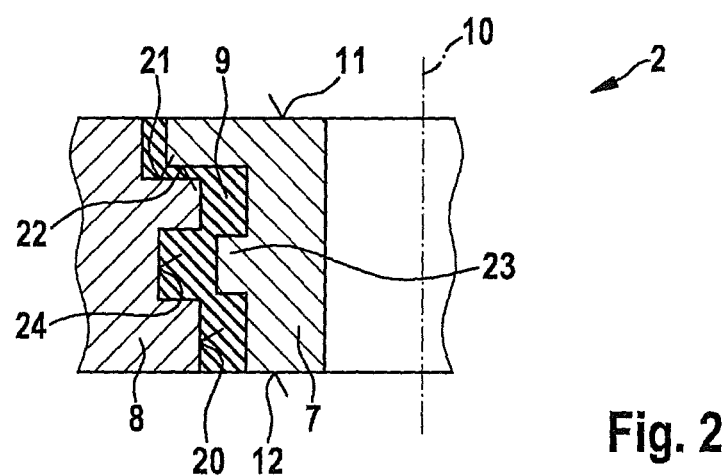
FIG. 2 a bearing bush in a schematic sectional representation in excerpted form, corresponding to a second exemplary embodiment of the present invention.

FIG. 2 shows a bearing bush 2 in a schematic sectional representation in excerpted form, corresponding to a second exemplary embodiment. In this exemplary embodiment, inner bush part 7 and outer bush part 8 have supporting contours 23, 24 adapted to each other at the continuous recess 20. Supporting contour 24 of outer bush part 8 is configured as a groove 24, in this exemplary embodiment. Supporting contour 23 of inner bush part 7 is configured as a rib 23 assigned to groove 24. Thereby a corresponding shape of layer 9 is specified, which forms elastically deformable damping element 9. The accommodation of mechanical loads is improved thereby. Consequently, an improved coherence of the components of bearing bush 2 comes about. Supporting contours 23, 24 may be configured to be symmetrical with respect to longitudinal axis 10.

Supporting contour 23 may also be configured as a disk. Furthermore, supporting contours 23, 24 may also be embodied as shoulders.

Figure 3:
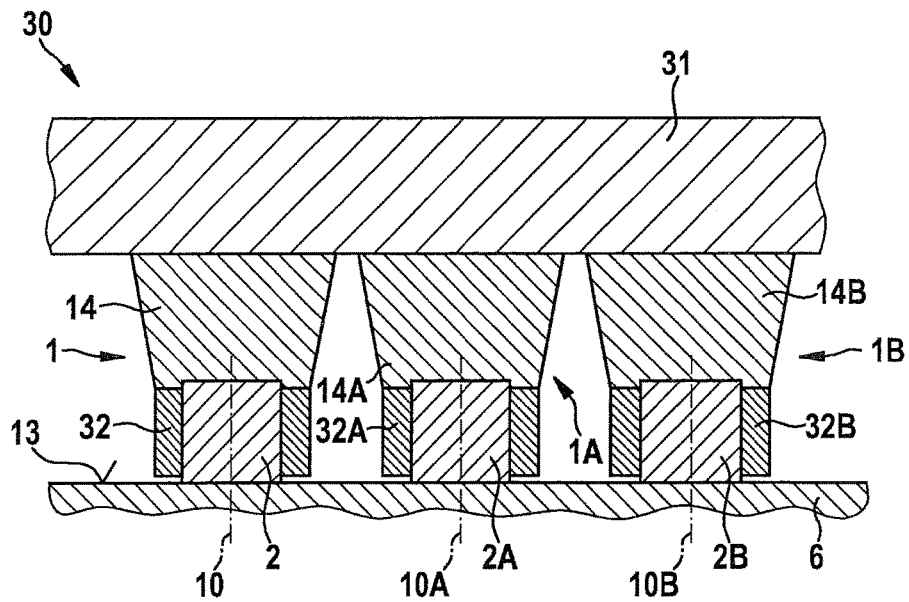
FIG. 3 a fuel injection system and an internal combustion engine in a schematic sectional representation in excerpted form, corresponding to a third exemplary embodiment of the present invention.

FIG. 3 shows a fuel injection system 30 having a fuel distributor 31 and holders 1, 1A, 1B in a schematic sectional representation in excerpted form, corresponding to a third exemplary embodiment. Fuel injection system 30 is fastened to an internal combustion engine 6, in this case. The fastening in this case is managed via holders 1, 1A, 1B. Holders 1, 1A, 1B have holder bodies 14, 14A, 14B on which in each case a holder section 32, 32A, 32B is embodied. Holders 1, 1A, 1B also have bearing bushes 2, 2A, 2B. In this exemplary embodiment, longitudinal axes 10, 10A, 10B of bearing bushes 2, 2A, 2B are oriented parallel to one another and in each case perpendicular to contact surface 13 of internal combustion engine 6. The fastening takes place via fastening arrangement 3 (FIG. 1), which are not shown in order to simplify the illustration in FIG. 3.

Corresponding to the fastening shown with reference to FIG. 3, other components 31 than a fuel distributor 31 may be connected to internal combustion engine 6 or another add-on structure 6. In this case, one or more holders 1, 1A, 1B may be used. Depending on the configuration of add-on structures 6, longitudinal axes 10, 10A, 10B may also be situated in a different manner with respect to one another.

Bearing bushes 2, 2A, 2B have been pressed into the respective holder section 32, 32A, 32B of holder bodies 14, 14A, 14B. In this instance, a tolerance compensation with respect to contact surface 13 may be made via the press-in depth. Because of this, the different distances of holder sections 32, 32A, 32B from contact surface 13 may be balanced. This makes possible production with greater tolerances.

Figure 4:
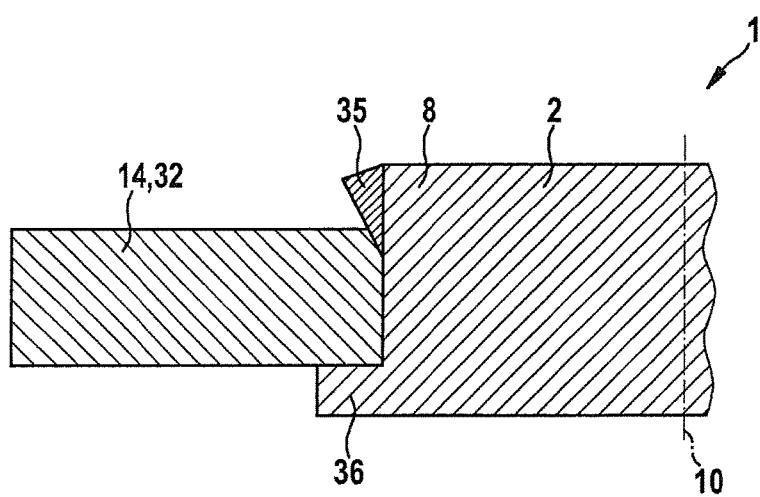
FIG. 4 a holder having a bearing bush in a schematic sectional representation in excerpted form, corresponding to a fourth exemplary embodiment of the present invention.

FIG. 4 shows a holder 1 having a bearing bush 2 in a schematic sectional representation in excerpted form. Bearing bush 2 may be embodied, in this instance, corresponding to the first exemplary embodiment described with reference to FIG. 1 or to the second exemplary embodiment described with reference to FIG. 2. To simplify the illustration, bearing bush 2 is shown only schematically in FIG. 4. Bearing bush 2 is connected to holder section 32 of holder body 14. In this context, bearing bush 2 may be pressed into holder section 32. Thereby outer bush part 8 of bearing bush 2 is connected to holder section 32 by being pressed in. Furthermore, in this exemplary embodiment, a caulking element 35 is provided. Caulking element 35 may be configured as a segmental or an annular caulking element. Caulking element 35 is joined in at a joining location between outer bush part 8 of bearing bush 2 and holder section 32. Thereby outer bush part 8 of bearing bush 2 is caulked to holder body 14. In this embodiment, the pressing in of bearing bush 2 into holder body 14 may be omitted, if necessary.

In an advantageous manner, outer bush part 8 has an outer annular shoulder 36, on which holder section 32 is supported during the caulking.

Figure 5:
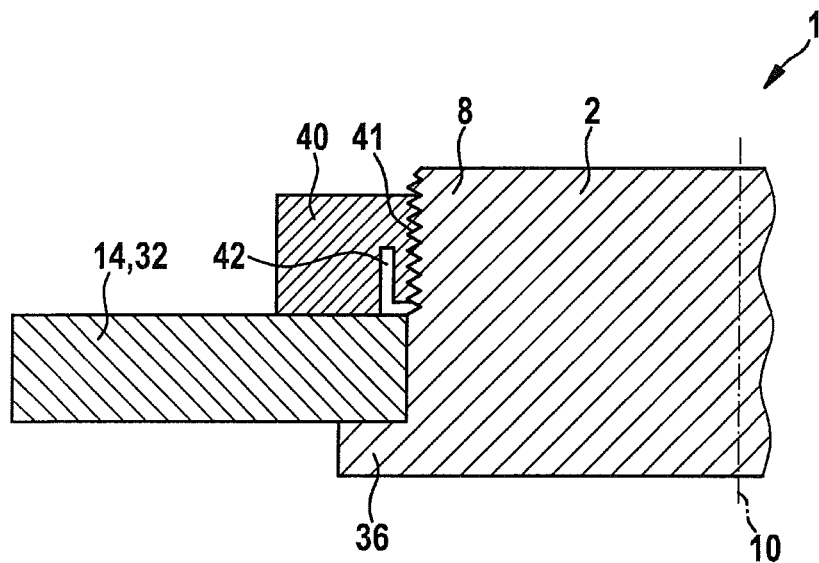
FIG. 5 a holder having a bearing bush in a schematic sectional representation in excerpted form, corresponding to a fifth exemplary embodiment of the present invention.

FIG. 5 shows holder 1 shown in FIG. 4 and having a bearing bush 2 corresponding to a fifth exemplary embodiment. In this exemplary embodiment a screw element 40 is provided. Screw element 40 is developed as an annular screw element 40. In particular, screw element 40 may be developed as a nut. Outer bush part 8 of bearing bush 2 has an outer thread 41, onto which screw element 40 is screwed. Holder section 32 is supported, on the one hand, on an annular shoulder 36. On the other hand, holder section 32 is acted upon by screw element 40. Thereby outer bush part 8 of bearing bush 2 is connected to holder body 14 by a screw element 40. Screw element 40 may have an undercut 42 in the form of an annular groove 42. Because of undercut 42, the effective clamping length of screw element 40 is able to be increased.

Figure 6:
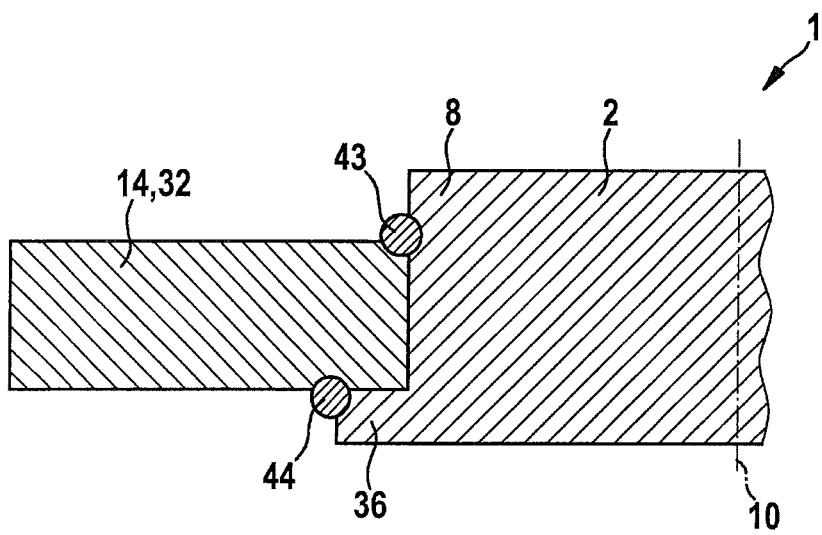
FIG. 6 a holder having a bearing bush in a schematic sectional representation in excerpted form, corresponding to a sixth exemplary embodiment of the present invention.

FIG. 6 shows holder 1 shown in FIG. 4 having a bearing bush 2 corresponding to a sixth exemplary embodiment. In this exemplary embodiment, outer bush part 8 of bearing bush 2 is welded to holder body 14 by laser welding. In this context, holder body 14 is supported, on the one hand, on annular shoulder 36 of outer bush part 8. By laser welding, one or more welding seams 43, 44 may be produced. Welding seams 43, 44 may extend in a circumferential direction about longitudinal axis 10. Thereby annular welding seams 43, 44 may be embodied. Other types of configurations are possible as well, however. In particular, using laser welding, a plurality of welding points 43, 44 may be produced.

The present invention is not restricted to the exemplary embodiments described.

What is claimed is:

1. A bearing bush for a holder, which is used for fastening a fuel distributor to an internal combustion engine, comprising: an inner bush part, which is formed at least essentially of a metallic material; an outer bush part, which is formed at least essentially of a metallic material and an elastically deformable damping element, the outer bush part having a continuous recess; wherein: the inner bush part is situated, at least in sections, along a longitudinal axis within the continuous recess, the elastically deformable damping element is situated between the inner bush part and the outer bush part, the outer bush part has a shoulder that extends perpendicular to the longitudinal axis, the inner bush part has a projection that projects perpendicular to the longitudinal axis, the projection of the inner bush part extends into a region above the shoulder of the outer bush part in the longitudinal direction, the inner bush part and the outer bush part have supporting contours adapted to each other at the continuous recess, at least one of the following: the supporting contour of the inner bush part is configured as a groove and the supporting contour of the outer bush part is configured as a rib or the supporting contour of the inner bush part is configured as a rib and the supporting contour of the outer bush part is configured as a groove; and the elastically deformable damping element has a shape that corresponds to the supporting contours of the inner bush part and the outer bush part so that the elastically deformable damping element has both a groove section and a rib section.

2. The bearing bush of claim 1, wherein the elastically deformable damping element is connected integrally to at least one of the inner bush part and the outer bush part.

3. The bearing bush of claim 1, wherein the elastically deformable damping element is connected to at least one of the inner bush part and the outer bush part by vulcanizing.

4. The bearing bush of claim 1, wherein the elastically deformable damping element is configured based on at least one of at least one elastomer and at least one rubber.

5. The bearing bush of claim 1, wherein the projection of the inner bush part is supported via the elastically deformable damping element on the shoulder of the outer bush part.

6. The bearing bush of claim 1, wherein the bearing bush is connectable to the internal combustion engine by a fastener which extends through the inner bush part of the bearing bush, and wherein the fastener includes a screw head, the screw head having a bottom surface that completely contacts a top surface of the projection of the inner bush part.

7. A holder for fastening a fuel distributor to an internal combustion engine, comprising a holder body; at least one bearing bush for the holder body, which is used for fastening the fuel distributor to the internal combustion engine, including: an inner bush part, which is formed at least essentially of a metallic material; an outer bush part, which is formed at least essentially of a metallic material and an elastically deformable damping element, the outer bush part having a continuous recess, wherein the inner bush part is situated, at least in sections, within the continuous recess, and wherein the elastically deformable damping element is situated between the inner bush part and the outer bush part; wherein: the bearing bush is connected to the holder body, the bearing bush is connectable to the internal combustion engine by a fastener which extends through the inner bush part of the bearing bush, the outer bush part has a shoulder that extends perpendicular to a longitudinal axis, the inner bush part has a projection that projects perpendicular to the longitudinal axis, the projection of the inner bush part extends into a region above the shoulder of the outer bush part in the longitudinal direction, the inner bush part and the outer bush part have supporting contours adapted to each other at the continuous recess, at least one of the following: the supporting contour of the inner bush part is configured as a groove and the supporting contour of the outer bush part is configured as a rib or the supporting contour of the inner bush part is configured as a rib and the supporting contour of the outer bush part is configured as a groove, and the elastically deformable damping element has a shape that corresponds to the supporting contours of the inner bush part and the outer bush part so that the elastically deformable damping element has both a groove section and a rib section.

8. The holder of claim 7, wherein the outer bush part of the bearing bush is pressed into the holder body.

9. The holder of claim 7, wherein the outer bush part of the bearing bush is caulked to the holder body.

10. The holder of claim 7, wherein the fastener is a screw element, wherein the outer bush part of the bearing bush is connected to the holder body by the screw element.

11. The holder of claim 7, wherein the outer bush part of the bearing bush is welded to the holder body by laser welding.

12. The holder of claim 7, wherein the fastener includes a screw head, the screw head having a bottom surface that completely contacts a top surface of the projection of the inner bush part.

13. A fuel-injection system, comprising: a fuel distributor; at least one holder for fastening the fuel distributor to an internal combustion engine, including: a holder body; at least one bearing bush for the holder body, which is used for fastening the fuel distributor to the internal combustion engine, including: an inner bush part, which is formed at least essentially of a metallic material; an outer bush part, which is formed at least essentially of a metallic material and an elastically deformable damping element, the outer bush part having a continuous recess, wherein: the inner bush part is situated, at least in sections, along a longitudinal axis within the continuous recess, the elastically deformable damping element is situated between the inner bush part and the outer bush part; wherein: the bearing bush is connected to the holder body, the bearing bush is connectable to the internal combustion engine by a fastener which extends through the inner bush part of the bearing bush, the outer bush part has a shoulder that extends perpendicular to the longitudinal axis, the inner bush has a projection that projects perpendicular to the longitudinal axis, the projection of the inner bush part extends into a region above the shoulder of the outer bush part in the longitudinal direction, the inner bush part and the outer bush part have supporting contours adapted to each other at the continuous recess, at least one of the following: the supporting contour of the inner bush part is configured as a groove and the supporting contour of the outer bush part is configured as a rib or the supporting contour of the inner bush part is configured as a rib and the supporting contour of the outer bush part is configured as a groove, and the elastically deformable damping element has a shape that corresponds to the supporting contours of the inner bush part and the outer bush part so that the elastically deformable damping element has both a groove section and a rib section.

14. The fuel-injection system of claim 13, wherein the fastener includes a screw head, the screw head having a bottom surface that completely contacts a top surface of the projection of the inner bush part.

\* \* \* \* \*